June 1, 1937.  S. D. MURPHY ET AL  2,082,416
COMPOSITE STRUCTURE
Original Filed July 30, 1935

INVENTORS
SHIRLEY D. MURPHY
FRANK V. OSBORN
BY
ATTORNEYS

Patented June 1, 1937

2,082,416

UNITED STATES PATENT OFFICE 2,082,416

COMPOSITE STRUCTURE

Shirley D. Murphy and Frank V. Osborn,
Indianapolis, Ind.

Original application July 30, 1935, Serial No. 33,860. Divided and this application January 20, 1936, Serial No. 59,814

3 Claims. (Cl. 20—74)

Our invention relates to a composite structure and, in particular, to a structure having a support of relatively cheap material, such as cold rolled steel, and a decorative structure consisting of a combination of stainless steel and a plastic material.

It is the object of our invention to provide decorative moldings or panels having alternative areas of plastic materials of various colors, shades and designs, and areas of stainless steel adapted to support the plastic material and to furnish the desired contrasting decorative effect; and, at the same time, to provide a structural support of adequate strength and of cheaper materials so as to provide the necessary rigidity for the composite molding or panel of stainless steel and plastic materials, while presenting to the view of the observer a non-corrosive, decorative material.

Due to the high cost of stainless steel, a decorative molding or panel made entirely of this material of such weight as to be utilized as a support would be of prohibitive cost. If this material is used only as a decorative material, no color contrast may be obtained and no designs can be satisfactorily formed.

It is the object of our invention to provide a rigidly supported composite structure of plastic material supported by the stainless steel, which stainless steel is supported by a rigid support fashioned of a cheaper material.

This application is a division of our copending application Serial No. 33,860 filed July 30, 1935.

Referring to the drawing:

Figure 1 is a top plan view of a strip of our composite molding, comprising a stainless steel strip or sheet integrally attached to a rigid support, which stainless steel strip or sheet has its edges enclosed in a covering of celluloid or the like;

Figure 1:
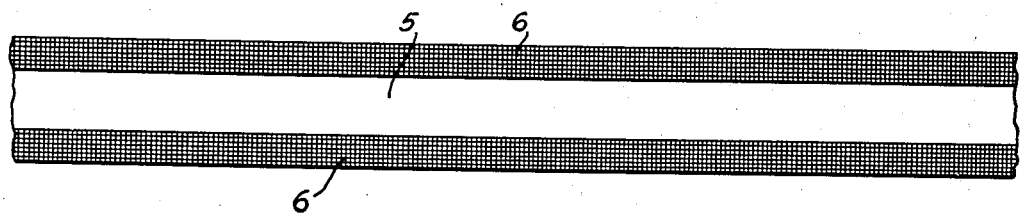
Figure 2:
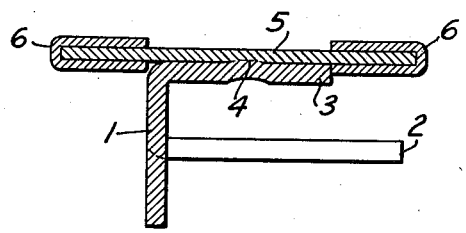
Figure 2 is an end elevational view of the structure shown in Figure 1.

When referring to such materials as "stainless steel", "celluloid" and "cold rolled steel", it will be understood that we are referring to these materials generically and by way of illustration, and do not desire to confine ourselves to these particular materials but only to those of general characteristics, advantages and disadvantages, which may be used in the same way as the materials referred to.

Referring to the drawing in detail, I designates the vertical portion of a support of cold rolled steel or the like having an attaching flange 2 integral therewith and preferably struck up therefrom. Formed integrally with this cold rolled steel support is a horizontally disposed portion extending at right angles to the portion I, and designated 3. This portion has an attaching face, upon which is integrally attached the stainless steel plate 5. We have shown the stainless steel plate attached to the portion 3 of the support by means of spot weld 4, but it is to be understood that any other suitable mode of integral attachment of the member 5 to the member 3 may be utilized.

The sheet, plate or strip 5 of stainless steel is bordered on either side by overlapping edge-engaging flanges 6 of "celluloid" or the like, whereby an extremely pleasing appearance is presented by the top surfaces of the spaced flanges 6 and the intermediate top surface of the stainless steel member 5. It is clear that, by utilizing flanges 6 of varying colors, either plain or with designs thereon, a wide range of decorative effects may be achieved by us in the production of decorative moldings or panels of great strength, extremely attractive, aesthetic or luxurious appearance, and of low cost.

It will be understood that the above description is illustrative and in nowise limited, and that we desire to comprehend within our invention such modifications as may be necessary to adapt it to varying conditions and uses.

Having thus fully described our invention, what we claim as new and desire to secure by Letters Patent is:

1. A molding structure comprising a cold rolled steel angle member, a strip of stainless steel rigidly attached to one face of said angle member and a pair of spaced flanges of preformed plastic material secured to the edges of said stainless steel strip and supported by said strip independently of said angle member.

2. A molding structure comprising a cold rolled steel angle member, a strip of stainless steel rigidly attached to one face of said angle member, and a pair of spaced flanges of preformed plastic material secured to the edges of said stainless steel strip, said angle member having an attaching flange struck up from one portion thereof and substantially parallel to the face thereof to which the stainless steel plate is attached.

3. A composite molding structure comprising a cold rolled steel angle member having an integral attaching flange thereon, said angle member having a stainless steel sheet rigidly attached thereto, said sheet having thereon integrally attached edge flanges of preformed plastic material which are spaced from one another to expose therebetween a portion of the stainless steel sheet to provide a contrasting decorative effect and which are supported solely by said stainless steel strip.

SHIRLEY D MURPHY.
FRANK V. OSBORN.